US006847519B2

(12) United States Patent
Arbisi et al.

(10) Patent No.: US 6,847,519 B2
(45) Date of Patent: Jan. 25, 2005

(54) PHONE WITH AUTOMATIC LINKED QWERTY KEYBOARD

(75) Inventors: Tom Arbisi, Ventura, CA (US); Michael Mckay, Calabasas, CA (US); Rhys Newman, Woodland Hills, CA (US); Nikolaj Bestle, Calabasas, CA (US)

(73) Assignee: Nokia Corporation, Espoo (FI)

( * ) Notice: Subject to any disclaimer, the term of this patent is extended or adjusted under 35 U.S.C. 154(b) by 15 days.

(21) Appl. No.: 10/184,551

(22) Filed: Jun. 28, 2002

(65) Prior Publication Data

US 2004/0223295 A1 Nov. 11, 2004

(51) Int. Cl.[7] .............................................. G06F 1/16
(52) U.S. Cl. ........................ 361/680; 361/686; 345/903
(58) Field of Search .................. 361/686, 679–681, 361/683; 345/903, 904

(56) References Cited

U.S. PATENT DOCUMENTS

| | | | |
|---|---|---|---|
| 5,126,725 A | * | 6/1992 | Yanagisawa |
| 5,189,632 A | * | 2/1993 | Paajanen et al. ....... 364/705.05 |
| 6,047,196 A | | 4/2000 | Mäkelä et al. |
| 6,243,595 B1 | | 6/2001 | Lee et al. |
| 6,370,362 B1 | | 4/2002 | Jansen et al. |
| 6,480,372 B1 | * | 11/2002 | Vong et al. ................. 361/680 |
| 6,542,721 B2 | | 4/2003 | Boesen |
| 2001/0027121 A1 | | 10/2001 | Boesen |

FOREIGN PATENT DOCUMENTS

| | | |
|---|---|---|
| WO | WO 01777786 A3 | 10/2001 |
| WO | WO 01777786 A2 | 10/2001 |
| WO | WO 03/021408 A2 | 3/2003 |

OTHER PUBLICATIONS

Lee et al. (US 2002/0186206 A1), "Computer With a Hiddeen Keyboard", Nov. 12, 2002.*
Hsieh et al. (US 2003/0048595 A1), "Collapsible Keyboard", May 13, 2003.*

* cited by examiner

Primary Examiner—Yean-Hsi Chang

(57) ABSTRACT

A portable device having a main unit and a keyboard unit. The main unit includes a display and the keyboard unit includes a full alphabet keyboard. Furthermore, the keyboard unit has a closed position and an open position. In the closed position a portion of the display is obstructed by the keyboard unit, and in the open position the display is unobstructed by the keyboard unit. The full alphabet keyboard is operable in both the closed position and the open position.

11 Claims, 4 Drawing Sheets

PHONE WITH AUTOMATIC LINKED QWERTY KEYBOARD

FIELD OF THE INVENTION

The present invention relates generally to portable electronic devices, and more specifically to a portable electronic device with a full alphabet keyboard.

BACKGROUND

As society becomes increasingly mobile, there is an ever-growing demand for electronic devices that are more powerful and more portable. In general, technology has answered this demand with lighter and stronger materials, and miniaturized electronics. For example, modern cellular telephones are small enough to be carried in a shirt pocket and powerful enough to send and receive electronic mail.

One drawback, however, of creating smaller devices is the decreasing amount of surface area on which to locate a convenient user interface. From an ergonomic point of view, the smaller the human interface is on a portable device, the harder it is to operate. Moreover, as a portable device becomes more capable, a more complex interface for the device is typically needed. Thus, there is increasing difficulty in portable device design to achieve devices that are smaller and more powerful, yet convenient to use.

SUMMARY OF THE INVENTION

Accordingly, the present invention provides a highly portable device having a full alphabet keyboard and display. The full alphabet keyboard can be operated when the device is in a compact "closed" configuration and in an ergonomic opens configuration. By providing a full alphabet keyboard usable in both the open and closed positions, data entry is easier and faster.

Thus, one aspect of the invention is a portable device having a main unit and a keyboard unit. The main unit includes a display and the keyboard unit includes a full alphabet keyboard. Furthermore, the keyboard unit has a closed position and an open position. In the closed position, a portion of the display is obstructed by the keyboard unit. In the open position, the display is unobstructed by the keyboard unit. The full alphabet keyboard is operable in both the closed position and the open position.

Another aspect of the invention is a portable device having a main unit, a keyboard unit, and a kickstand linking the main unit and the keyboard unit. The main unit includes a display and the keyboard unit includes a full alphabet keyboard. The keyboard unit has a closed position and an open position, wherein in the closed position a portion of the display is obstructed by the keyboard unit and in the open position the display is unobstructed by the keyboard unit. The kickstand is configured to guide the keyboard unit as it moves between its open position and its closed position.

The foregoing and other features, utilities and advantages of the invention will be apparent from the following more particular description of various embodiments of the invention as illustrated in the accompanying drawings.

DETAILED DESCRIPTION OF THE INVENTION

Figure 1:
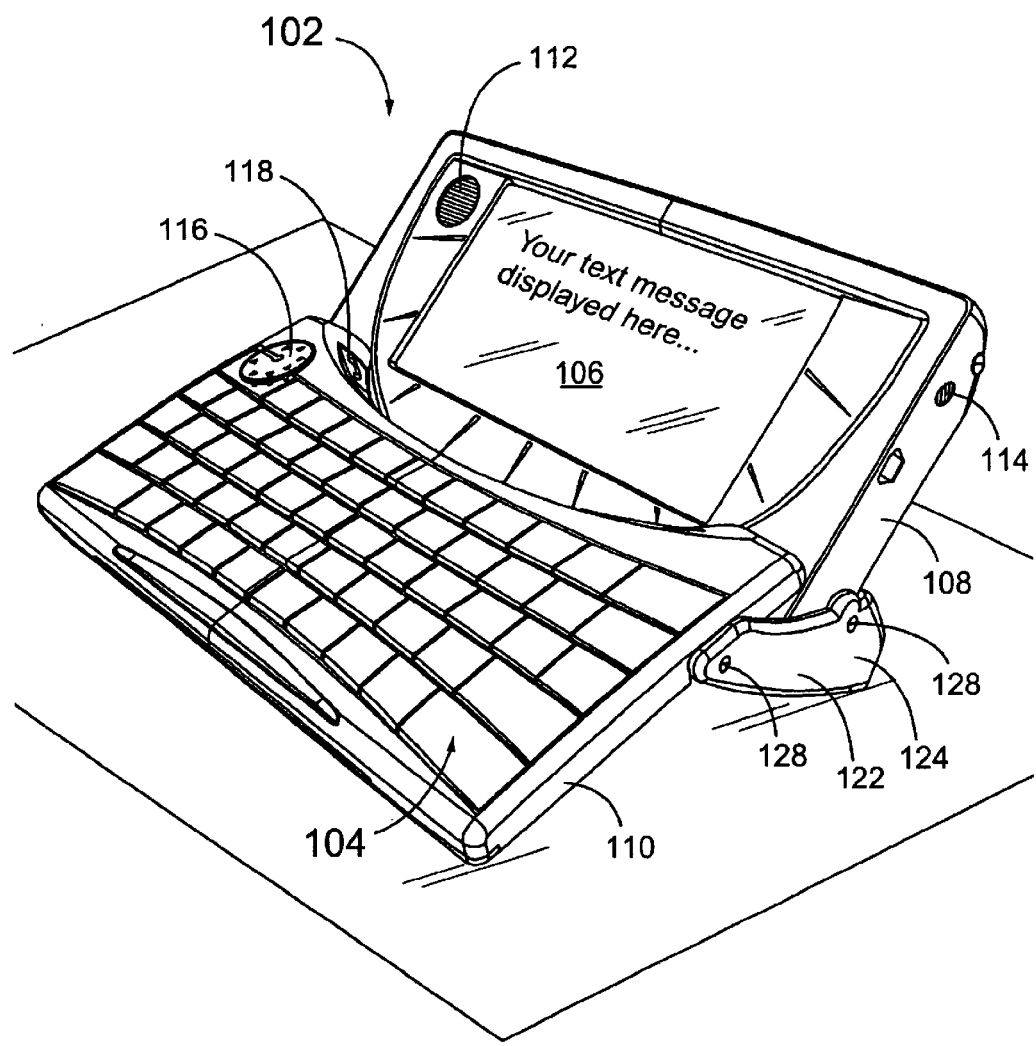
FIG. 1 shows an exemplary portable device in an open position.

The invention is described in detail below with reference to FIGS. 1–4. When referring to the figures, like structures and elements shown throughout are indicated with like reference numerals.

Figure 2:
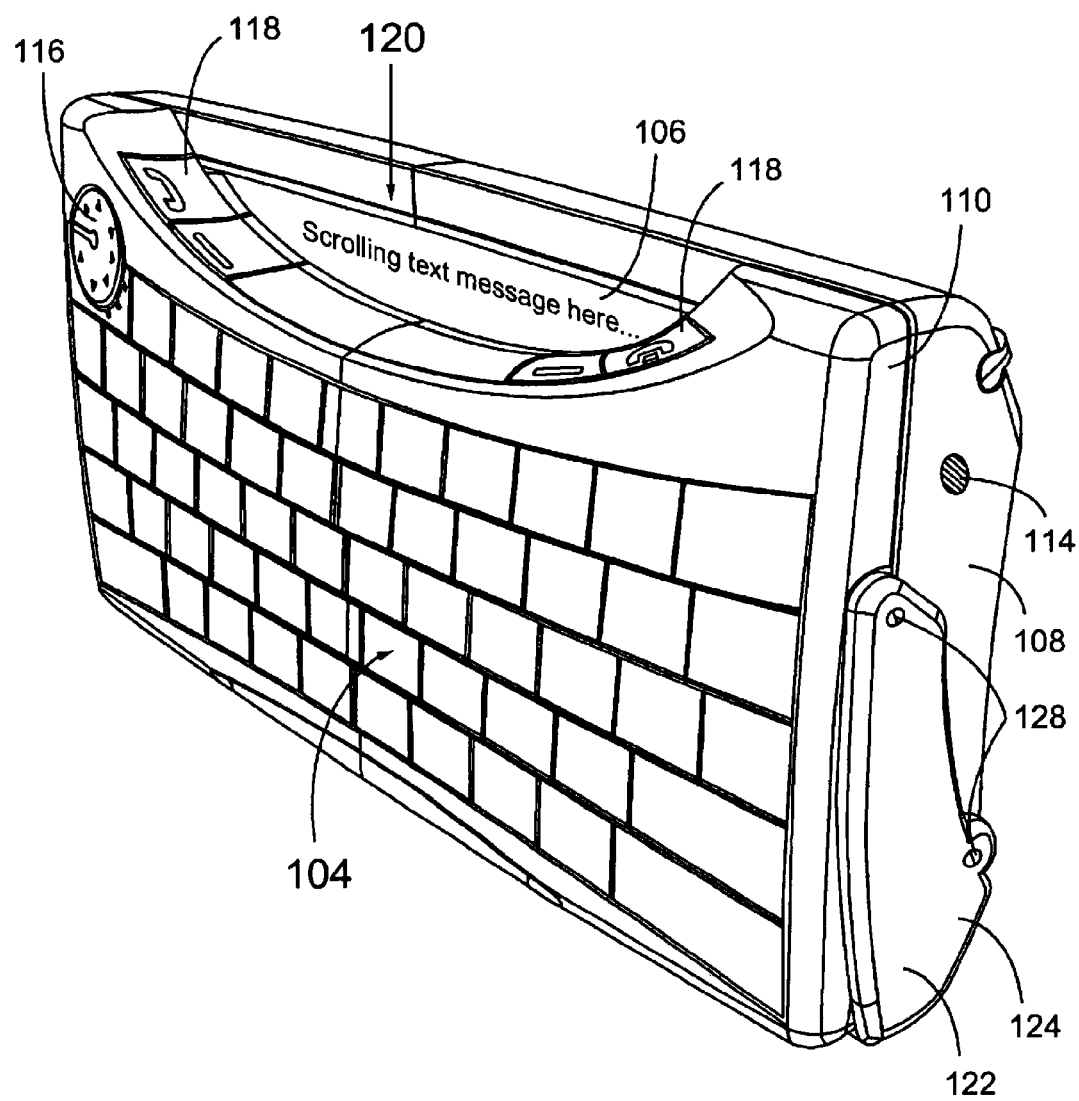
FIG. 2 shows the exemplary portable device in a closed position.
Figure 3D:
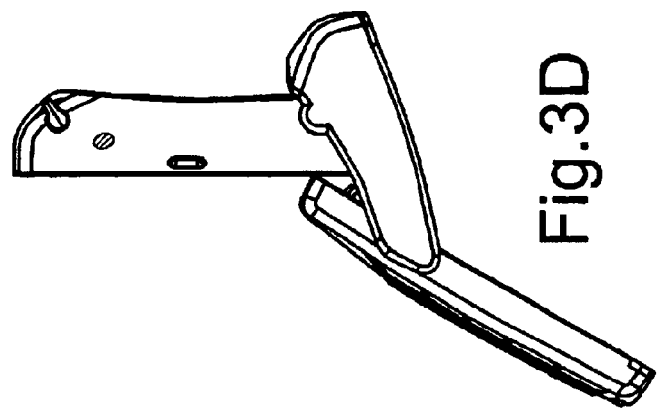
FIGS. 3A–3D illustrate the motion of the exemplary portable device as it moves from the closed position to the open position.
Figure 3C:
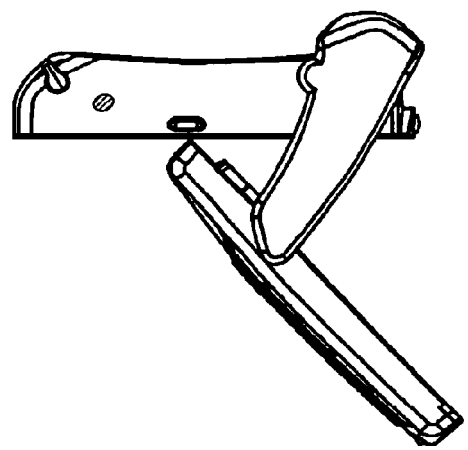
Figure 3B:
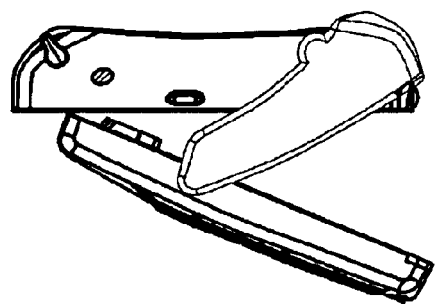
Figure 3A:
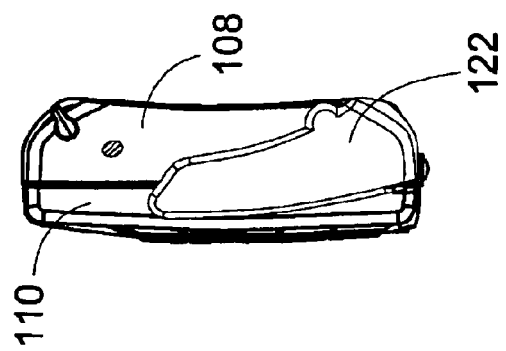
Figure 4:
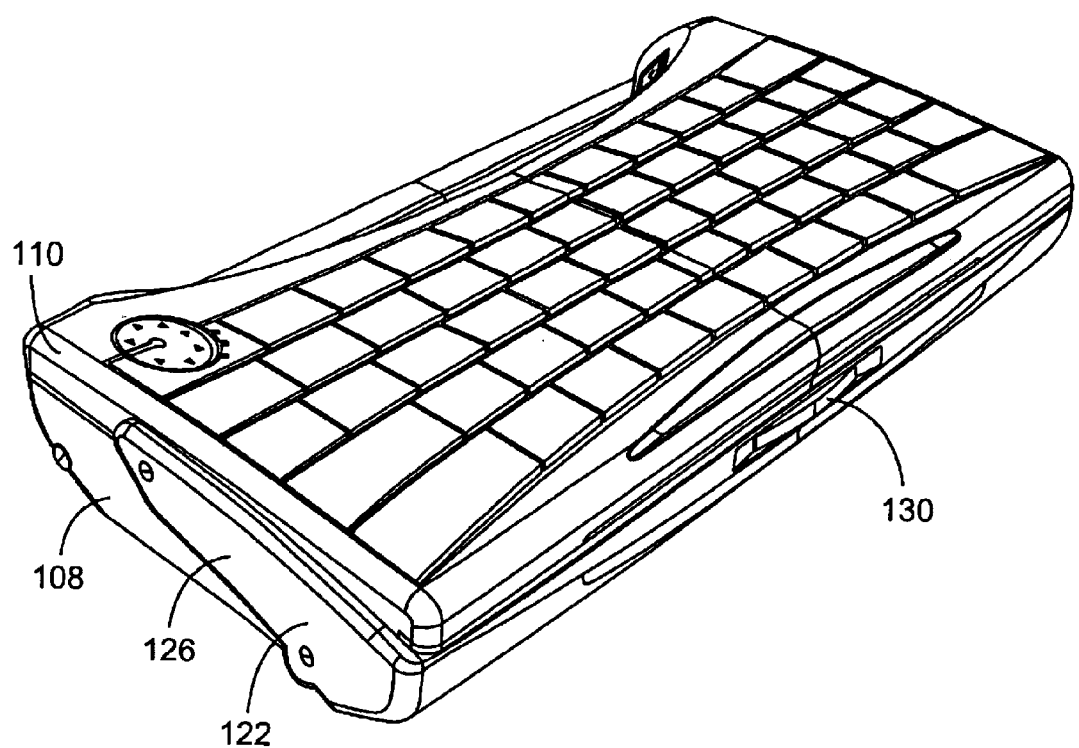
FIG. 4 shows another view of the exemplary portable device in the closed position.

FIG. 1 shows an exemplary portable device 102, as contemplated by the present invention, in an open position and FIG. 2 shows the device 102 in a closed position. As discussed in more detail below, the device 102 includes a full alphabet keyboard 104 and a display 106, and is beneficially configured such that the keyboard 104 and display 106 are operable in both the closed position and the open position. This arrangement greatly enhances the usability of the device 102 without sacrificing its mobility. Furthermore, the use of a single display and keyboard for both the closed position and open position helps decrease manufacturing costs and simplifies construction.

The device 102 includes a main unit 108 housing the display 106. It is contemplated that the display may include a touch-sensitive or pen-sensitive screen. Furthermore, the main unit 108 may contain other interface mechanisms, such as a speaker 112 and a microphone 114. In a particular embodiment of the invention, the main unit 108 includes a cellular communication system (not shown), such as a mobile phone. In another embodiment of the invention, the main unit 108 can contain a computer system (not shown), including a microprocessor, memory, a motherboard, and a power source. Implementations of these, and other embodiments of the invention, can be tailored by those skilled in the art to meet the specific needs of end users.

The keyboard unit 110 includes the full alphabet keyboard 104, and may additionally include a navigation pad 116, menu keys 118, and other input interfaces known to those skilled in the art. For example, the keyboard unit 110 may include a touch-sensitive surface or a joystick (not shown). As used herein, the term "full alphabet keyboard" refers to a keyboard containing individual input keys for the major characters or letters of a language. For example, a full alphabet keyboard for the English language includes individual input keys for the letters A through Z. The full alphabet keyboard may additionally include keys for inputting numbers (i.e., 0 through 9), commonly used symbols (i.e., $, %, &, etc.), and function keys (i.e., a shift key). In a particular embodiment of the invention, the full alphabet keyboard layout is a Remington typewriter layout, popularly known as a "QWERTY" keyboard layout.

As shown in the figures, the keyboard unit 110 is movable from a closed position (see FIG. 2) to an open position (see FIG. 1), and vise-versa. In the closed position, the keyboard unit 110 lies on top of the main unit 108 and obstructs a portion of the display 106. In one embodiment of the invention, the keyboard unit 110 defines a display opening 120 which exposes a portion of the display 106 in the closed position, allowing limited readability of the display 106. In a particular embodiment of the invention, the display opening 120 is substantially curvilinear. The closed position therefore provides a highly compact arrangement which greatly enhances portability of the device 102, while still maintaining the convenience of an operative full alphabet keyboard 104 for data input. Furthermore, the keyboard unit 110 helps protect the display 106 against damage and foreign particles in the closed position.

In the open position, the keyboard unit 110 is positioned away from the main unit 108 and the display 106 is unobstructed by the keyboard unit 110. In this arrangement, the full alphabet keyboard 104 is usable for data input and the entire display 106 is readable, thus providing a more robust and ergonomic user interface. Therefore, the present invention beneficially provides a highly portable configuration of the device in the closed position, and a more ergonomic configuration in the open position. Furthermore, the full alphabet keyboard 104 is operable in both the open and closed positions of the keyboard unit 110.

It is contemplated that the device 102 adjusts the manner in which information is presented on the display 106 according to whether the keyboard unit 110 is in the open position or the closed position. For example, when the keyboard unit 110 is in the open position, information may be displayed using the entire screen and messages are be scrolled up and down. When the keyboard unit 110 is in the closed position, for example, information is displayed only on a few lines and messages are scrolled left and right in ticker-tape fashion.

The device 102 also includes a kickstand 122 having a left kickstand member 124 and a right kickstand member 126 (see FIG. 4) on opposite sides of the device. The kickstand 122 links the main unit 108 and the keyboard unit 110, and guides the opening and closing motion of the keyboard unit 110. Moreover, the kickstand 122 acts as a base, providing upright support and stability when the keyboard unit 110 is in the open position.

FIGS. 3A, 3B, 3C, and 3D show the device 102 moving from the closed position to the open position. As illustrated in the sequence, the keyboard unit 110 moves away from the main unit 108 as the device moves from the closed position to the open position. In addition, as the device moves from the closed position to the open position, the kickstand 112 rotates behind the main unit 108. This action allows the kickstand 112 to support the device in an upright position by moving the device's center of gravity toward the keyboard unit 110.

Referring back to FIG. 1 and FIG. 2, it is contemplated that the keyboard unit 110 is lockable in the closed position and that the kickstand 122 includes torsion springs 128 which bias the keyboard unit 110 to the open position. In this manner, the keyboard unit 110 is spring-loaded in the closed position. The device 102 is further configured with a release button 130 (see FIG. 4) which releases the keyboard unit 110 from the closed position when activated. Since the keyboard unit 110 is biased to the open position, the release button 130 causes the keyboard unit 110 to move to the open position when activated. Such an arrangement advantageously allows the device 102 to be opened using only one hand.

It is contemplated that the keyboard unit 110 and the main unit 108 may be electrically coupled in several ways. For example, the main unit 108 may include connectors (not shown) on its top and bottom, and the keyboard unit 110 may also include a back connector (not shown) that engages the top connector in the closed position and the bottom connector in the open position. In another embodiment of the invention, the device 102 may include flexible wiring (not shown) electrically coupling the main unit 108 and the keyboard unit 110. The wiring may be positioned within the kickstand 122 or behind the keyboard unit 110.

The foregoing description of the invention has been presented for purposes of illustration and description. It is not intended to be exhaustive or to limit the invention to the precise form disclosed, and other modifications and variations may be possible in light of the above teachings. Thus, the embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A portable device, the portable device comprising:
   a main unit including a display; and
   a keyboard unit including a keyboard, the keyboard unit adjustably linked so as to be adjustable between a closed position and an open position relative to the main unit, wherein the keyboard is operable when the keyboard unit is in either the closed position or the open position;
   wherein the keyboard unit includes a keyboard unit connector and the main unit includes a first connector and a second connector such that the keyboard unit connector and the first connector electrically engage when the keyboard unit is in the closed position, and the keyboard unit connector and the second connector electrically engage when the keyboard unit is in the open position.

2. A portable device, the portable device comprising:
   a main unit including a display;
   a keyboard unit including a keyboard, the keyboard unit adjustably linked so as to be adjustable between a closed position and an open position relative to the main unit, wherein the keyboard is operable when the keyboard unit is in either the closed position or the open position; and
   a linking member for adjustably linking the main unit and the keyboard unit, wherein the linking member extends beyond the main unit so as to form a support for the portable device when the keyboard unit is in the open position.

3. The portable device of claim 2, wherein the keyboard unit is biased to the open position.

4. The portable device of claim 3, further comprising a release means configured to release the keyboard unit from the closed position.

5. The portable device of claim 2, wherein the linking member includes a first member and a second member, the first member and the second member being disposed on substantially opposite sides of the portable device.

6. The portable device of claim 2, further comprising at least one spring for biasing the keyboard unit to the open position.

7. The portable device of claim 2, wherein the linking member includes at least one conductor for electrically coupling the main unit to the keyboard unit.

8. The portable device of claim 2, wherein the keyboard unit defines a display opening for exposing the unobstructed portion of the display when the keyboard unit is in the closed position.

9. The portable device of claim 8, wherein the display is operable to present visual information on the unobstructed portion of the display when the keyboard unit is in the closed position.

10. The portable device of claim 2, wherein the portable device is a mobile telephone for communicating via a cellular communication system.

11. The portable device of claim 2, wherein the portable device is a node operable within a computer network.

* * * * *